Jan. 18, 1949.    A. L. ANDERSON ET AL    2,459,611
INVERTER MOTOR

Filed Aug. 23, 1945    2 Sheets-Sheet 1

INVENTORS
ARTHUR LEONARD ANDERSON
RICHARD C. BURNS
BY
H. G. Manning
ATTORNEY

Jan. 18, 1949.   A. L. ANDERSON ET AL   2,459,611
INVERTER MOTOR
Filed Aug. 23, 1945   2 Sheets-Sheet 2
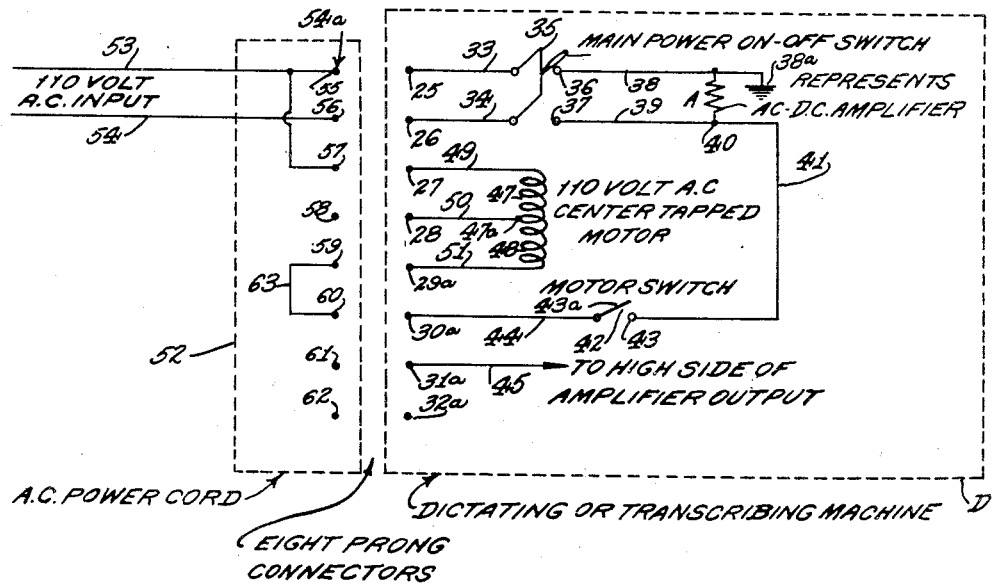
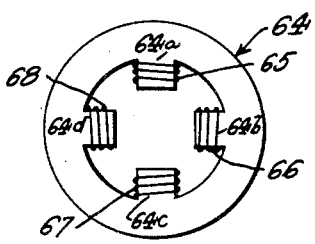
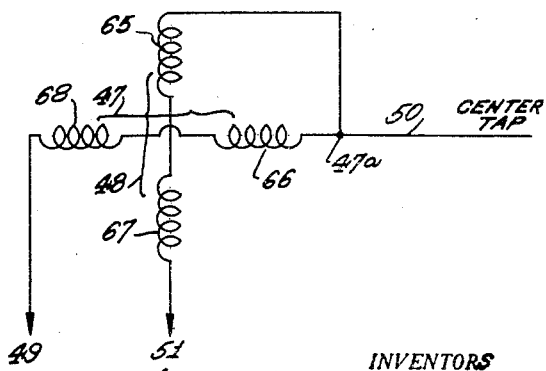
INVENTORS
ARTHUR LEONARD ANDERSON
RICHARD C. BURNS
BY
H. G. Manning
ATTORNEY Patented Jan. 18, 1949

2,459,611

UNITED STATES PATENT OFFICE 2,459,611

INVERTER MOTOR

Arthur Leonard Anderson and Richard C. Burns, New Haven, Conn., assignors to The Soundscriber Corporation, New Haven, Conn., a corporation of Connecticut Application August 23, 1945, Serial No. 612,276

9 Claims. (Cl. 171—97)

This invention relates to phonographs and more particularly to a dictating or transcribing machine having a record-supporting turntable driven by an A. C. electric induction motor.

One object of the present invention is to provide an apparatus of the above nature having means for combining the A. C. motor with an inverter so that the motor may be operated either on D. C. or A. C.

A further object is to provide an inverter motor apparatus of the above nature including a vibrator circuit for furnishing alternating pulses of current of opposite directions to separate portions of the motor field coil.

A further object is to provide a device of the above nature having means to isolate the vibrator from the D. C. power line whereby undesired noises will not be transmitted into said line and amplified.

A further object is to provide an inverter motor apparatus of the above nature in which resistance is employed in the inverter circuit for reducing the voltage impulses of each half cycle to such a value as well provide the required A. C. voltage for the proper operation of the motor.

A further object is to provide an apparatus of the above nature, which will be simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

In the drawings,

Fig. 2 is a view, similar to Fig. 1, showing the appearance of the circuit when the motor is being driven from a source of A. C.

Fig. 3 is an end view of the stator of the A. C. motor, showing the four poles and associated field coils, located at 90 degree intervals apart.

Fig. 4 is a circuit diagram of the field coils of the stator, showing the arrangement of the four coil sections with alternate pairs thereof connected together in series.

Figure 1:
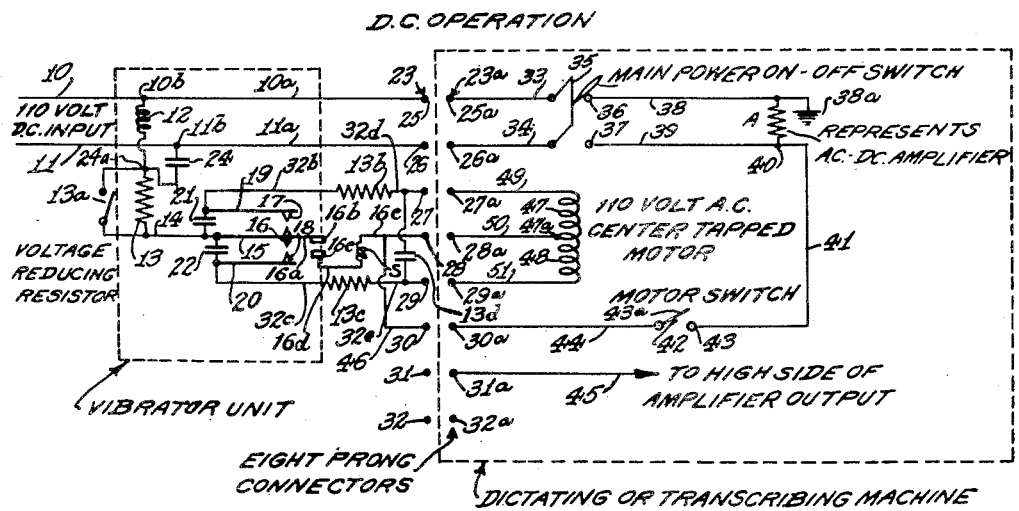
Fig. 1 represents a circuit diagram of the complete apparatus, as it appears when being operated on D. C.

This invention is an improvement over that disclosed in a prior patent to Lincoln Thompson, No. 2,342,503, of February 22, 1944, entitled "Control circuits for sound recording apparatus," and reissued on February 20, 1945, as Reissue No. 22,606.

The present invention includes an inverter unit having a vibrator of a conventional type oscillating at 60 cycles per second, and has circuit connections to cause said vibrator to periodically furnish 60 pulses per second of current alternating in direction to the motor field.

The connections between the sources of D. C. and A. C., the vibrator, and the A. C. motor, are made by means of an 8-conductor cord having an 8-prong socket which is adapted to be connected to an 8-prong plug on the dictating machine.

In the Reissue Patent No. 22,606, mentioned above, circuits were described whereby an external vibrator-inverter was used with a dictating machine having an A. C.—D. C. amplifier and a motor operating only on A. C. In that patented apparatus, provision was made of a D. C. vibrator and a transformer which supplied the motor with A. C.

This construction was highly convenient when the dictating machine was used in an office supplied with D. C., and when it was brought elsewhere for use on A. C. In such a case, the inverter-transformer apparatus could be left at the office and its weight in this instance was of no importance. However, with portable dictating machines which have to be used on either A. C. or D. C. supply lines, the inconvenience of transporting the heavy inverter apparatus became a serious problem.

With the present invention, an improved inverter apparatus is employed which is extremely light in weight, and very compact, by reason of the fact that no transformer is required in the construction thereof.

With the present invention, the A. C. motor field coils are provided with a center tap, and a sufficient voltage-reducing resistance is introduced into the inverter circuit so that each half of the motor field will operate at approximately 55 volts. Alternate pulses of current in opposite directions will thus be impressed upon the two halves of the complete motor field winding. By means of this construction the transformer is entirely eliminated.

Referring now to the drawings in which like reference numerals denote corresponding parts throughout the several views, the numerals 10 and 11 indicate a pair of D. C. line wires, supplied with 110 volts. Connected with a junction 10b on the wire 10 is a choke coil or inductance 12 leading to a resistor 13 which serves to cut down the voltage supplied to the inverter, to be hereinafter described. A short-circuiting switch 13a is connected to the ends of the resistor 13, and when closed cuts out said resistor and causes a greater voltage to be supplied to the motor, whereby a fast start may be obtained, which is particularly necessary in a recording apparatus.

A condenser 24 is connected from a junction 11b on the wire 11 to a junction between the coil 12 and the resistor 13. This choke-condenser network serves to suppress high frequency components ("hash") of the waves impressed across the motor, and acts as a filter between the vibrator and the D. C. line.

A conductor 14 connects the resistor 13 with a resilient tuned iron vibrator rod 15 similar to the magnetic reed member 48a which is magnetically operated by the solenoid 84 described in Patent No. Re. 22,606, referred to above.

The rod 15 has a double-pointed contact 16 and is adapted to be vibrated at the rate of 60 cycles per second by means of a solenoid S connected at one end by a wire 16d to a fixed contact 16c. The other end of the solenoid S is connected by a wire 16e to the wire 46 which leads to the aperture 28 which is adapted to be connected to a prong 28a leading to the center tap 47a of the motor.

The end of the vibrator rod 15 has an extension 16a carrying on its extremity a movable armature contact 16b which initially lies in engagement with the fixed contact 16c.

The contact 16 is normally out of engagement with the fixed contacts 17, 18 located on the ends of a pair of conducting rods 19, 20, respectively.

A pair of additional resistors 13b and 13c are also employed to cut down further the voltage, said resistors being located in conductors 32b and 32a, respectively, to be described later.

Between the conducting rod 19 and the conductor 14, provision is made of a spark-suppressing condenser 21, and a similar condenser 22 is located between the conductor 14 and the rod 20, as clearly shown in Fig. 1.

In order to connect the source of D. C. and the inverter to the dictating or transcribing machine, provision is made of an 8-aperture connector socket 23, which is adapted to engage an 8-prong connector plug 23a located on the dictating or transcribing machine M as indicated in dotted lines in Fig. 1.

The connector socket 23 is provided with eight apertures 25, 26, 27, 28, 29, 30, 31, and 32, while the connector plug 23a is provided with eight prongs 25a, 26a, 27a, 28a, 29a, 30a, 31a, and 32a, respectively. All of the above-mentioned apertures and prongs are active, except 31, 32, and 32a, which are idle and serve merely to guide the connector socket 23 and plug 23a into closed position.

The wires 32c and 32b, respectively, connect the resistors 13c and 13b to the conducting rods 20 and 19, respectively. The voltage drops through these resistors (13c, 13b) serve to further reduce the potential applied to the motor to the value necessary for proper operation.

An additional pair of wires 32e and 32d serve to connect the resistors 13c and 13b to the socket contacts 29 and 27, respectively.

A condenser 13d is connected across the wires 32e and 32d and is of such a value that its reactance is equal and opposite to the inductive reactance of the motor at a frequency of 60 cycles per second, thus giving a condition of parallel resonance which causes the A. C. voltage wave applied to the motor to be approximately sinusoidal in shape. The motor will thus be allowed to develop its maximum power from the applied voltage.

Provision is also made of a pair of wires 33, 34, connected to the contacts 25a, 26a, which serve to supply D. C. from the wires 10a, 11a to a two-pole single-throw switch 35, the blades of which are connected to a pair of stationary contacts 36, 37, which in turn are connected to a pair of conductors 38, 39 leading to an A. C.–D. C. amplifier A, which is indicated for simplicity, in the form of an equivalent resistance. One side of the amplifier is grounded at 38a.

A junction 40 between the A. C.–D. C. amplifier A and the wire 39 is connected by a wire 41 to a motor switch 42 of the single-throw single-pole type, having a fixed contact 43. The movable contact 43a of the motor switch 42 is connected by a wire 44 to the contact 30a of the plug 23a.

Provision is also made of a conductor 45 leading to the ungrounded side of the amplifier outlet for short-circuiting the recording head when the remote control apparatus described in the above-mentioned Patent Re. 22,606 is employed. A wire 46 serves to connect the contacts 28 and 30 of the socket 23, as clearly shown in Fig. 1.

Motor field coil

Connected with the contacts 27a, 28a, and 29a of the plug 23a, are three conductors 49, 50, and 51, leading to a pair of split field coil sections 47 and 48 having a center tap 47a, as shown.

A. C. operation

Fig. 4 shows the circuit when energized from a source of A. C. Thus, a power cord 52 is provided, which is connected to the A. C. line by means of a pair of wires 53, 54, and provision is also made of an 8-aperture socket 54a having contacts 55, 56, 57, 58, 59, 60, 61, and 62. A conductor 63 serve to join the contacts 59 and 60. The socket 54a is adapted to receive the 8-prong plug 23a having contacts 25a, 26a, 27a, 28a, 29a, 30a, 31a, and 32a previously described.

Stator

As clearly shown in Figs. 5 and 6, provision is made of a stator 64 having four radial poles 64a, 64b, 64c, 64d, upon which are mounted four field coil sections 65, 66, 67, 68, respectively—the sections 65, 67 being connected together to form the series circuit 48, and the sections 66, 68 being similarly connected together to form the second series circuit 47 mentioned above. As clearly shown in Fig. 6, the coils 65, 66 are connected to the common center tap 47a, while the coils 67, 68 are connected to the contacts 49, 51, respectively.

D. C. Operation

In the operation of the machine on D. C., when the power is turned on, the solenoid S will magnetically attract the resilient iron rod 15 and raise the contact 16b from the fixed contact 16c breaking the circuit. The double-pointed contact 16 of the vibrator rod 15 will then strike the contact 17 and D. C. will pass from the line wire 10 through the junction 10b, coil 12, resistor 13, wire 14, rod 15, contact 17, rod 19, wire 32b, resistor 13b, wire 32d, contacts 27, 27a, wire 49, to the split field coil 47 through the center tap 47a, wire 50, contacts 28a, 28, wire 46, contacts 30, 30a, wire 44, blade 43a, contact 43, wires 41, 39, 34, contacts 26a, 26, and wire 11a to the line wire 11. This completes one half of a motor-operating cycle.

Through its resiliency the rod 15 will then move down causing the contact 16b to again engage the contact 16d. The contact 16 will also be caused to engage the contact 18, and current will then flow from the line wire 10, junction 10b through the coil 12, resistor 13, wire 14, rod 15, contacts 16 and 18, rod 20, wire 32a, resistor 13c, wire 32c, contacts 29, 29a, wire 51, field coil section 48 to the center tap 47a, wire 50, contacts 28a, 28, wire 46, contacts 30, 30a, wire 44, blade 43a, contact 43, wires 41, 39, 34, contacts 26a, 26, wire 11a back to the line wire 11.

Each of these pulses of current in opposite directions constitutes half of a 60 cycle wave at approximately 55 volts ("root-mean square"), and the motor field windings 47, 48 are thus continuously supplied with 60 cycles A. C. at approximately 110 volts.

It will be understood that the resistors 13, 13b, and 13c must be of the correct value to reduce the voltage of each half section of the motor field winding to the proper value for operation, i. e. approximately 55 volts.

It will also be understood that the vibrating rod 15 may be used on either the grounded or ungrounded side of the D. C. line.

One advantage of the present invention is that the voltage reducing resistors 13, 13b, 13c may, if desired, be chosen to produce a voltage above the 55 volts required for each half of the motor winding for extra fast starting of the motor when recording. The resistors 13, 13b, 13c may also be chosen to reduce the voltage applied to the A. C. motor when a lower operating temperature is desired when transcribing.

A further advantage of the present invention is that by the use of the choke coil 12, the resistance 13, and the condenser 24, any possibility of back current waves from the inverter vibrator reaching the wires 10a, 11a is prevented, thus avoiding undesired noises in the amplifier, recording head, loudspeaker, or headphone.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all of the modifications and embodiments coming within the scope of the following claims.

Having thus fully described the invention, what is claimed as new, and for which it is desired to secure Letters Patent, is:

1. In an apparatus for operating an A. C. electric motor with D. C., a stator having a split field comprising four coils located at 90 degree intervals, each pair of opposed coils being connected in a separate series circuit, a center tap connected with both circuits, an inverter-vibrator having a central movable contact tuned to oscillate at 60 cycles per second connected to one terminal of a source of D. C., a pair of outer fixed contacts alternately engaged by said central movable contact and connected to the outer terminals of said separate field coil circuits, resistance means to cut in half the voltage supplied to said separate fields, and means to oscillate said central contact between said fixed contacts whereby the D. C. supply will be converted into alternating current pulses in opposite directions and combined to produce A. C. for operating said motor.

2. In an apparatus for operating an A. C. electric motor with D. C., a split field comprising a pair of coils for energizing the armature of said motor, a center tap between said coils, an inverter vibrator having a central movable contact tuned to vibrate at 60 cycles per second and electrically connected to one terminal of the source of D. C., said inverter including a pair of outer fixed contacts in the path of and adapted to be alternately engaged by said movable contact and connected to the outer terminals of the field coil sections, resistance means to cut in half the voltage supplied to said inverter vibrator and field coils, and means to vibrate said central contact whereby said motor will be supplied with alternating current from said inverter.

3. The invention as defined in claim 2, in which spark-suppressing condensers are employed between the fixed contacts of the vibrator and the central movable contact thereof.

4. The invention as defined in claim 2, in which a filter condenser is employed between the movable contact of the vibrator and the other side of the D. C. supply line.

5. The invention as defined in claim 2, in which an isolating inductance is employed in the circuit connection between the first side of the D. C. supply line and the movable vibrator contact.

6. The invention as defined in claim 2, in which a choke-condenser network is connected to the inverter circuit to suppress the high frequency components of the waves impressed upon the motor.

7. The invention as defined in claim 2, in which means are provided in the circuit connection between the D. C. supply and the inverter vibrator to isolate the latter from causing back interference with said supply and other electrical apparatus connected therewith.

8. The invention as defined in claim 2, in which an isolating choke-condenser network is employed between the movable contact of the vibrator and the D. C. supply line.

9. The invention as defined in claim 2, in which a condenser is applied across the motor field coil having a reactance equal and opposite to the inductive reactance of the motor.

ARTHUR LEONARD ANDERSON.
RICHARD C. BURNS.

REFERENCES CITED

The following references are of record in the file of this patent:

UNITED STATES PATENTS

| Number | Name | Date |
| --- | --- | --- |
| 2,086,323 | Garstang | July 6, 1937 |